United States Patent
Manamohan et al.

(10) Patent No.: US 12,273,394 B2
(45) Date of Patent: *Apr. 8, 2025

(54) SYSTEM AND METHOD OF DECENTRALIZED MANAGEMENT OF DEVICE ASSETS OUTSIDE A COMPUTER NETWORK

(71) Applicant: Hewlett Packard Enterprise Development LP, Houston, TX (US)

(72) Inventors: Sathyanarayanan Manamohan, Karnataka (IN); KrishnaPrasad Lingadahalli Shastry, Karnataka (IN); Avinash Chandra Pandey, Karnataka (IN); Ravi Sarveswara, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 209 days.

This patent is subject to a terminal disclaimer.

(21) Appl. No.: 17/691,744

(22) Filed: Mar. 10, 2022

(65) Prior Publication Data

US 2022/0201047 A1    Jun. 23, 2022

Related U.S. Application Data

(63) Continuation of application No. 16/163,484, filed on Oct. 17, 2018, now Pat. No. 11,330,019.

(30) Foreign Application Priority Data

Apr. 30, 2018 (IN) .............................. 201841016311

(51) Int. Cl.
*H04L 9/40* (2022.01)
*H04L 9/08* (2006.01)
*H04L 67/10* (2022.01)

(52) U.S. Cl.
CPC .......... *H04L 63/205* (2013.01); *H04L 9/0894* (2013.01); *H04L 63/02* (2013.01); *H04L 67/10* (2013.01)

(58) Field of Classification Search
CPC ..... H04L 63/205; H04L 9/0894; H04L 63/02; H04L 67/10; H04L 9/50
See application file for complete search history.

(56) References Cited

U.S. PATENT DOCUMENTS

| | | | |
|---|---|---|---|
| 6,363,416 | B1 | 3/2002 | Naeimi et al. |
| 9,413,779 | B2 | 8/2016 | Vasseur et al. |

(Continued)

FOREIGN PATENT DOCUMENTS

| | | |
|---|---|---|
| AU | 2017100968 A4 | 9/2017 |
| CN | 105488675 A | 4/2016 |

(Continued)

OTHER PUBLICATIONS

Castro et al, "Practical Byzantine Fault Tolerance", Proceedings of the Third Symposium on Operating Systems Design and Implementation, New Orleans, USA, Feb. 1999 (Year: 1999).

(Continued)

*Primary Examiner* — Bruce S Ashley
(74) *Attorney, Agent, or Firm* — Hewlett Packard Enterprise Patent Department (57) ABSTRACT

The disclosure relates to decentralized management of edge nodes operating outside an enterprise network using blockchain technology. A management node may operate within a firewall of the enterprise to manage the edge nodes operating outside the firewall using blockchain technology. The management node may coordinate management by writing change requests to a decentralized ledger. The edge nodes may read the change requests from its local copy of the distributed ledger and implement the change requests.

(Continued)

Upon implementation, an edge node may broadcast its status to the blockchain network. The management node may mine the transactions from the edge nodes into the distributed ledger, thereby creating a secure and scalable way to coordinate management and record the current and historical system state. The system also provides the edge nodes with a cryptographically secured, machine-to-machine maintained, single version of truth, enabling them to take globally valid decision based on local data.

18 Claims, 5 Drawing Sheets

(56) References Cited

U.S. PATENT DOCUMENTS

| | | | |
|---|---|---|---|
| 9,569,517 | B1 | 2/2017 | Smola et al. |
| 9,633,315 | B2 | 4/2017 | Chapelle et al. |
| 9,779,557 | B2 | 10/2017 | Hauser et al. |
| 9,875,510 | B1 | 1/2018 | Kasper |
| 10,057,243 | B1* | 8/2018 | Kumar ............... H04L 63/0823 |
| 10,360,500 | B2 | 7/2019 | Kabul et al. |
| 10,547,679 | B1 | 1/2020 | Burnett et al. |
| 10,671,435 | B1 | 6/2020 | Gold et al. |
| 11,201,747 | B2 | 12/2021 | Scherrer et al. |
| 11,334,817 | B2 | 5/2022 | Wang et al. |
| 2012/0039473 | A1 | 2/2012 | Gentry et al. |
| 2013/0290223 | A1 | 10/2013 | Chapelle et al. |
| 2015/0324690 | A1 | 11/2015 | Chilimbi et al. |
| 2015/0332283 | A1 | 11/2015 | Witchey |
| 2015/0379072 | A1 | 12/2015 | Dirac et al. |
| 2016/0087854 | A1* | 3/2016 | Jayanti Venkata ........ G06F 8/71 |
| | | | 709/224 |
| 2016/0179835 | A1 | 6/2016 | Mika et al. |
| 2016/0217388 | A1 | 7/2016 | Okanohara et al. |
| 2016/0261690 | A1* | 9/2016 | Ford ..................... G06F 21/645 |
| 2016/0299918 | A1 | 10/2016 | Ford |
| 2016/0335533 | A1 | 11/2016 | Davis et al. |
| 2017/0060988 | A1 | 3/2017 | Kudo et al. |
| 2017/0091397 | A1 | 3/2017 | Shah |
| 2017/0103468 | A1 | 4/2017 | Orsini et al. |
| 2017/0116693 | A1 | 4/2017 | Rae et al. |
| 2017/0134158 | A1 | 5/2017 | Pasol et al. |
| 2017/0140145 | A1 | 5/2017 | Shah |
| 2017/0169358 | A1 | 6/2017 | Choi et al. |
| 2017/0220949 | A1 | 8/2017 | Feng et al. |
| 2017/0272342 | A1 | 9/2017 | Zessin et al. |
| 2017/0279774 | A1 | 9/2017 | Booz et al. |
| 2017/0289111 | A1 | 10/2017 | Voell et al. |
| 2017/0302663 | A1 | 10/2017 | Nainar et al. |
| 2018/0018590 | A1 | 1/2018 | Szeto et al. |
| 2018/0039667 | A1 | 2/2018 | Pierce et al. |
| 2018/0089683 | A1 | 3/2018 | Setty et al. |
| 2018/0157688 | A1* | 6/2018 | Zessin ................ G06F 16/2219 |
| 2018/0183768 | A1 | 6/2018 | Lobban et al. |
| 2018/0217905 | A1 | 8/2018 | Reza et al. |
| 2018/0247191 | A1 | 8/2018 | Katz et al. |
| 2018/0276626 | A1* | 9/2018 | Laiben ............... G06Q 20/3829 |
| 2018/0331897 | A1 | 11/2018 | Zhang et al. |
| 2019/0020629 | A1 | 1/2019 | Baird et al. |
| 2019/0042407 | A1 | 2/2019 | Gao et al. |
| 2019/0089716 | A1 | 3/2019 | Stocker |
| 2019/0138929 | A1 | 5/2019 | Wong et al. |
| 2019/0147532 | A1 | 5/2019 | Singh et al. |
| 2019/0182030 | A1 | 6/2019 | Jo |
| 2019/0182231 | A1 | 6/2019 | Harrer et al. |
| 2019/0268284 | A1* | 8/2019 | Karame ................ H04L 9/3236 |
| 2019/0287026 | A1 | 9/2019 | Calmon et al. |
| 2019/0295000 | A1 | 9/2019 | Candel et al. |
| 2019/0317934 | A1 | 10/2019 | Jentzsch et al. |
| 2019/0325432 | A1 | 10/2019 | Ow et al. |
| 2019/0332921 | A1 | 10/2019 | Rodriguez |
| 2019/0332955 | A1 | 10/2019 | Manamohan et al. |
| 2019/0332966 | A1 | 10/2019 | Gidney |
| 2019/0347540 | A1 | 11/2019 | Yim et al. |
| 2020/0042362 | A1 | 2/2020 | Cui et al. |
| 2020/0050494 | A1* | 2/2020 | Bartfai-Walcott .... G06F 9/5083 |
| 2020/0057920 | A1 | 2/2020 | Collins et al. |
| 2020/0193292 | A1 | 6/2020 | Weng et al. |
| 2020/0218940 | A1 | 7/2020 | Anglin et al. |
| 2020/0242511 | A1 | 7/2020 | Kale et al. |
| 2020/0244435 | A1 | 7/2020 | Shpurov et al. |
| 2020/0272845 | A1 | 8/2020 | He et al. |
| 2020/0311617 | A1 | 10/2020 | Swan et al. |
| 2020/0348662 | A1 | 11/2020 | Cella et al. |
| 2021/0019630 | A1 | 1/2021 | Yao et al. |
| 2021/0134095 | A1 | 5/2021 | Milt et al. |
| 2021/0287080 | A1 | 9/2021 | Moloney |
| 2022/0261634 | A1 | 8/2022 | Liu et al. |
| 2022/0344060 | A1 | 10/2022 | Kristal et al. |
| 2023/0010095 | A1 | 1/2023 | Alabbasi et al. |
| 2023/0041118 | A1 | 2/2023 | Imabayashi et al. |

FOREIGN PATENT DOCUMENTS

| | | |
|---|---|---|
| CN | 106228446 A | 12/2016 |
| CN | 106445711 A | 2/2017 |
| CN | 106656798 A | 5/2017 |
| CN | 106911513 A | 6/2017 |
| CN | 107103087 A | 8/2017 |
| CN | 107332900 A | 11/2017 |
| CN | 107395349 A | 11/2017 |
| CN | 107395353 A | 11/2017 |
| CN | 107579848 | 1/2018 |
| CN | 107656832 A | 2/2018 |
| CN | 107665154 A | 2/2018 |
| CN | 107864198 A | 3/2018 |
| CN | 107967539 A | 4/2018 |
| CN | 108268638 A | 7/2018 |
| CN | 109033757 A | 12/2018 |
| CN | 109685501 A | 4/2019 |
| CN | 109889326 A | 6/2019 |
| CN | 110428056 A | 11/2019 |
| CN | 110490330 A | 11/2019 |
| EP | 3564873 A1 | 11/2019 |
| GB | 2559592 A | 8/2018 |
| WO | 2017/203093 A1 | 11/2017 |
| WO | 2018/059939 A1 | 4/2018 |
| WO | 2018/130267 A1 | 7/2018 |
| WO | 2018/191030 A1 | 10/2018 |

OTHER PUBLICATIONS

Chen et al, "On Security Analysis of Proof-of-Elapsed-Time (PoET)", In: Spirakis, P., Tsigas, P. (eds) Stabilization, Safety, and Security of Distributed Systems. SSS 2017. Lecture Notes in Computer Science(), vol. 10616. Springer, Cham, https://doi.org/10.1007/978-3-319-69084-1_19 (Year: 2017).
Feng et al, "Scalable Dynamic Multi-Agent Practical Byzantine Fault-Tolerant Consensus in Permissioned Blockchain". Appl. Sci. 2018, 8, 1919. https://doi.org/10.3390/app8101919 (Year: 2018).
Nguyen et al, "A Survey about Consensus Algorithms Used in Blockchain", J Inf Process Syst, vol. 14, No. 1, pp. 101-128, Feb. 2018 https://doi.org/10.3745/JIPS.01.0024 (Year: 2018).
European Search Report and Search Opinion received for EP Application No. 21747157.2, mailed on Oct. 28, 2022, 5 pages.
Li et al., "DLBC: A Deep Learning-Based Consensus in Blockchains for Deep Learning Services", IEEE Transactions on Services Computing, Jan. 31, 2020, 13 pages.
Lihu et al., "A Proof of Useful Work for Artificial Intelligence on the Blockchain", Jan. 25, 2020, 25 pages.
Teerapittayanon et al., "DaiMoN: A Decentralized Artificial Intelligence Model Network", Jul. 2019, 8 pages.
Venkataraman, M., et al., "Adopting Blockchain for Enterprise Asset Management (EAM)," IBM's Developer, Mar. 17, 2017, pp. 12.
"Decentralized Machine Learning White Pape"r, available online at <www.decentralizedml.com>, Dec. 31, 2017, 58 pages.
Abadi et al., "TensorFlow: A System for Large-Scale Machine Learning", 2th USENIX Symposium on Operating Systems Design and Implementation (OSDI '16), Nov. 2-4, 2016, 21 pages.

(56) References Cited

OTHER PUBLICATIONS

Acar et al., "A Survey on Homomorphic Encryption Schemes: Theory and Implementation", ACM Computing Surveys, vol. 51, No. 4, Article 79, Jul. 2018, pp. 79:1-79:35.
Ali et al., "Applications of Blockchains in the Internet of Things: A Comprehensive Survey", IEEE Communications Surveys & Tutorials, 2018, 42 pages.
Bank for International Settlements, "Distributed ledger technology in payment, clearing and settlement", Committee on Payments and Market Infrastructures, Feb. 2017, 29 pages.
Ben Dickson, "The case for decentralized artificial intelligence", TechTalks, available online at <https://bdtechtalks.com/2018/01/10/decentralized-ai-blockchain/>, Jan. 10, 2018, 5 pages.
Bonawitz et al., "Practical Secure Aggregation for Privacy-Preserving Machine Learning", Cryptology ePrint Archive: Report 2017/281, 2017, 21 pages.
Catherine Sturman, "Owkin is set to use machine learning to augment medical and biology research", Healthcare Global, available online at <https://www.healthcareglobal.com/technology/owkin-set-use-machine-learning-augment-medical-and-biology-research>, Jun. 19, 2018, 8 pages.
Chen et al., "Algorand", Computer Science Cryptography and Security, May 26, 2017, pp. 1-75.
Chen et al., "When Machine Learning Meets Blockchain: A Decentralized, Privacy-preserving and Secure Design", IEEE International Conference on Big Data (Big Data), 2018, pp. 1178-1187.
Cheung, et, al., "Distributed Machine learning white paper," 2017. (Year 2017).
Diro et al., "Deep Learning: The Frontier for Distributed Attack Detention in Fog-to-Things Computing", IEEE Communications Magazine, Feb. 2018, , pp. 169-175.
Extended European Search Report received for EP Patent Application No. 18177565.1, mailed on Nov. 30, 2018, 08 pages.
Extended European Search Report received for EP Patent Application No. 18177566.9, mailed on Dec. 13, 2018, 07 pages.
Extended European Search Report received for EP Patent Application No. 18183265.0, mailed on Feb. 4, 2019, 11 pages.
Fred Ehrsam, "Blockchain-based Machine Learning Marketplaces", Medium, available online at <https://medium.com/@FEhrsam/blockchain-based-machine-learning-marketplaces-cb2d4dae2c17>, Mar. 13, 2018, 10 pages.
Georgopoulos et al., "Distributed machine learning in networks by consensus", Neurocomputing, Elsevier, vol. 124, 2013, 11 pages.
Kate et al, "Distributed Key Generation in the Wild", Report 2012/377, 2012, pp. 1-30.
Kim et al., "On-Device Federated Learning via Blockchain and its Latency Analysis", Research Gate, Aug. 2018, 4 pages.
Kurakin et al., "Adversarial Examples in the Physical World", CoRR, abs/1607.02533, 2017, pp. 1-14.
Kurtulmus et al., "Trustless Machine Learning Contracts; Evaluating and Exchanging Machine Learning Models on the Ethereum Blockchain", Research Gate, Feb. 27, 2018, 11 pages.
Lei Shi, "The convergence of AI and IoT, are we there yet?", available online at <https://northstream.se/insights/blog/the-convergence-of-ai-and-iot-are-we-there-yet/>, Oct. 11, 2017, 11 pages.
Li et al., "Scaling Distributed Machine Learning with the Parameter Server", 11th USENIX Symposium on Operating Systems Design and Implementation, Oct. 6-8, 2014, 17 pages.
M. Shen, X. Tang, L. Zhu, X. Du and M. Guizani, "Privacy-Preserving Support Vector Machine Training Over Blockchain-Based Encrypted IoT Data in Smart Cities," in IEEE Internet of Things Journal, vol. 6, No. 5, pp. 7702-7712, Oct. 2019, doi: 10.1109/JIOT.2019.2901840. (Year: 2019).
Mendis et al., "Blockchain as a Service: An Autonomous, Privacy Preserving, Decentralized Architecture for Deep Learning", Research Paper, Jul. 5, 2018, pp. 1-8.
Nakamoto et al., "Bitcoin: A Peer-to-Peer Electronic Cash System", Oct. 31, 2008, pp. 1-9.
Nedic et al., "Network Topology and Communication-Computation Tradeoffs in Decentralized Optimization", Jan. 15, 2018, 32 pages.
Pop at al., "Blockchain Based Decentralized Management of Demand Response Programs in Smart Energy Grids", MDPI, Jan. 9, 2018, pp. 1-21.
Sandha et al., "In-database Distributed Machine Learning: Demonstration Using Teradata SQL Engine," Proceedings of the VLDB Endowment, vol. 12, No. 12., Aug. 2019, pp. 1854-1857.
Search Report and Written Opinion received for PCT Application No. PCT/US2020/019064, mailed on Jun. 2, 2020, 15 pages.
Search Report and Written Opinion received for PCT Application No. PCT/US2021/013394, mailed on Apr. 19, 2021, 08 pages.
Search Report and Written Opinion received for PCT Application No. PCT/US2021/014932, mailed on May 13, 2021, 08 pages.
Shokri et al., "Membership Inference Attacks Against Machine Learning Models", CoRR, abs/1610.05820, 2017, 16 pages.
Singla et al.., "Machine Learning for Secure Device Personalization Using Blockchain", IEEE, Sep. 19, 2018, 7 pages.
Verbraeken et al., A Survey on Distributed Machine Learning, (Research Paper), ACM Computing Surveys, vol. 53, No. 2, Mar. 2020, pp. 1-33.
Weng et al., "DeepChain: Auditable and Privacy-Preserving Deep Learning with Blockchain-based Incentive", Journal of Latex Class Files, vol. 14(8), Nov. 2019, pp. 1-18.
Yuan et al., "Privacy Preserving Back-Propagation Neural Network Learning Made Practical with Cloud Computing", IEEE Transactions on Parallel and Distributed Systems, 2013, vol. 25, pp. 1-11.
Yuguang, Y. et al., "Review and Research for Consensus Mectlanisrn of Block Ct1ain," Apr. 5, 2018, Journal of Information Security Research 4A, pp. 369-379.
Zhang et al., "Stay Fresh: Speculative Synchronization for Fast Distributed Machine Learning", 2018 IEEE 38th International Conference on Distributed Computing Systems (ICDCS), 2018, 11 pages.
Reisizadeh et al., "Robust and Communication-Efficient Collaborative Learning", Oct. 31, 2019, 33 pages.
Resizadeh, et. al., "Quantized Decentralized Consensus Optimization"; 2018 IEEE Conference on Decision and Control (CDC) (Year: 2018).
Zhu, et. al., Blockchain-Based Privacy Preserving Deep Learning. In: Guo, F., Huang, X., Yung, M. (eds) Information Security and Cryptology. Inscrypt 2018. Lecture Notes in Computer Science(), vol. 1144 (Year: 2018).
Watanabe et al, "Blockchain contract: A complete consensus using blockchain," 2015 IEEE 4th Global Conference on Consumer Electronics (GCCE), 2015, pp. 577-578, doi: 10.1109/GCCE.2015. 7398721. (Year: 2015).
Yang et al. "Federated Machine Learning: Concept and Applications." arXiv preprint arXiv:1902.04885 (2019). (Year: 2019).
860/Towards-Fair-and-Privacy-Preserving-Federated-Deep-Models.pdf (Year: 2020).
Lyu, Lingjuan et al. "Toward Fair and Decentralized Privacy-Preserving Deep Learning with Blockchain" Jun. 4, 2019 [Online] Downloaded Sep. 25, 2024 https://www.researchgate.net/profile/Xingjun-Ma/publication/333617529_Towards_Fair_and_Privacy-Preserving_Federated_Deep_Models/links/5d159dc9299bf1547c84 (Year: 2019).
Tran, Nguyen H. et al "Federated Learning over Wireless Networks: Optimization Model Design and Analysis" May 2019 [Online] Downloaded Sep. 25, 2024 https://ieeexplore.IEEE.org/stamp/stamp.jsp?tp=&arnumber=8737464 (Year: 2019).

* cited by examiner

SYSTEM AND METHOD OF DECENTRALIZED MANAGEMENT OF DEVICE ASSETS OUTSIDE A COMPUTER NETWORK

CROSS REFERENCE TO RELATED APPLICATIONS

The present application claims priority to Indian Patent Application No. 201841016311, filed on Apr. 30, 2018, which is related to co-pending and co-owned Indian Patent Application No. 201841016315, filed on Apr. 30, 2018, which are hereby incorporated by reference herein in its entirety.

DESCRIPTION OF THE RELATED ART

Geo-distributed decentralized enterprise infrastructures such as factory floors, clusters of geographically distributed servers and fleets of autonomous vehicles, can be difficult to manage. These systems can be massive in scale, completely decentralized and heterogeneous in nature. The management challenges may be compounded in applications in which these infrastructures have devices (also referred to as "nodes") that operate outside of an enterprise network. Accordingly, it is often the case that the enterprise includes one or more nodes that are owned by a variety of different users, which can create a problem for conventional management solutions.

Devices that are distributed geographically and are part of the enterprise but are owned or controlled by multiple parties are typically administered through an open (public) network. Management operation on public networks opens up a new attack surface that regular management solutions are not designed to handle. Furthermore, the automatic addition of new edge devices poses an additional challenge of synchronizing the new device to the correct state. For example, adding a new autonomous vehicle to a network of vehicles will require the new vehicle to have the correct software configuration state before it is fully functional within the network.

These issues are not necessarily limited to public network implementations. For example, geo-distributed privately owned systems may also face a similar set of problems. Even though the system may be legally owned by one entity, different departments (or other entities) of the same private entity may be tasked with administering the individual components of the system.

A similar problem may exist when an existing node goes offline and re-enters the network or restarts. Other problems such as malicious attacks on a given node may require a reset to a trusted or checkpointed state. However, conventional management systems do not have a mechanism to derive a single version of truth about the state of the system. This may result from the state of the system being fragmented and present in individual management domains. Also, nodes and software (firmware, OS, etc.) cannot always be fully trusted because there is no authoritative version of state that can be used to allow every interacting entity to classify a node as compliant or non-compliant. Non-compliant nodes pose the risk of compromising the entire network.

BRIEF SUMMARY OF THE DISCLOSURE

According to various embodiments of the disclosed technology, a management server may manage one or more edge nodes, outside a private network, through a blockchain network. Each edge node may be permitted to read but not write to a distributed ledger of the blockchain network. The management server may both write to and read from the distributed ledger (as well as blockchain transactions) to convey management requests to the edge nodes. The management server (also referred to as a "management node") may obtain a change request to be transmitted to at least a first edge node among the one or more edge nodes. The change request may specify one or more management operations.

The management node may transmit the change request to the edge nodes by generating and transmitting a blockchain transaction. The management node may write the blockchain transaction to a first ledger block that includes a payload comprising the transaction that specifies the change request. The management node may add the first ledger block to the distributed ledger, a copy of which is stored at each of the one or more edge nodes.

Each edge node may obtain the change request either from the blockchain transaction (such as in a transaction pool) and/or from its local copy of the distributed ledger. Each edge node may determine whether the change request should be implemented and update its state to indicate whether the change request has been implemented. Each edge node may then broadcast its state to the blockchain network, which may be performed by generating a blockchain transaction indicating its state.

The management node may obtain, from each of the one or more edge nodes, a respective state of each node. The management node may do so by obtaining and reading a blockchain transaction from an edge node. In some instances, the management node may generate a second ledger block that includes a second payload that indicates the respective state of each of the one or more edge nodes obtained from the blockchain transaction. The ledger entry may point to one or more transactions that each indicate a state of an edge node. The management node in these instances may add the second ledger block to the distributed ledger, thereby creating an immutable record of the state of the blockchain network, including state transitions resulting from change requests.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which arm defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shah not be considered limiting of the breadth, scope, or applicability thereof.

The figures arm not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

Embodiments of the systems and methods disclosed herein may be implemented to provide a controller framework that allows participant nodes in a network to interact with each other using blockchain technology. The use of blockchain technology for these interactions may be implemented to ensure that the interactions are secured, non-repudiated, sequenced and permissioned. Embodiments may also be implemented to use a blockchain to allow participants to evolve a consensus protocol for the evaluation of change proposals by network participants. For example, consensus protocols can be agreed by all participants and implemented as smart contracts in the system using blockchain technology. One example of a simple protocol may be a protocol used by a node to determine whether to accept a change proposal based on local policies that govern implementation of requested changes. Continuing with this example, a smart contract may be used to implement this protocol and deploy it on the network.

In another embodiment, operations may be implemented to provide provenance tracking across a heterogeneous distributed storage platform to track which nodes conducted which operations on which systems. In some applications, metadata operations may be routed via a blockchain and storage devices or other network entities can be configured to accept operations only via the blockchain interface. For example, storage devices on the network can be commanded to allow metadata operations only via the blockchain interface. In this way, factors such as identity, authorization, provenance, non-repudiation and security can be provided for operations on nodes managed in this way.

Accordingly, embodiments may be implemented in which the management operation becomes decentralized and the system no longer requires a central entity to enforce policies. Particularly, in some applications the system may be implemented with no central management server, and may instead use only a management node or nodes to input management instructions onto the blockchain using blockchain transactions. Once a change is approved, a device may implement the change and the blockchain can be used to provide a clear record of state of the system as it evolves over time, Because embodiments may be implemented in a peer-to-peer environment without a central management entity, the enterprises scalable without limitations on how many nodes a central management entity might be able to address. Additionally, the absence of a central management entity may also eliminate this entity as a single point of failure. This may provide the added benefit of reducing attack surfaces by eliminating a single point of failure that might otherwise be used to bring the system down.

Decentralized management of assets operating outside a computer network (also referred to as edge nodes) from within the computer network may be achieved. The edge nodes may include enterprise devices and the computer network may include the enterprise's network. Network traffic to and from the computer network may pass through a firewall around the computer network. A management server (also referred to as a management node) may operate within the firewall to manage the configuration of edge nodes operating outside the firewall using blockchain technology. The management node and the edge nodes may be part of a blockchain network.

The management node may act as a full node that stores a complete or at least updated copy of a distributed ledger. The management node may also act as a miner that has permission to write blocks to the distributed ledger. The management node may mine management operations in the form of change requests into the distributed I and edger. The management operations may include, without limitation, removal of an edge node from the network (such as resulting from non-compliance of the edge node to set protocols followed by the network), addition of a new asset (edge node) in to the network and configure the new asset, proposal of a new software update that will be installed on all edge nodes, execution of a status check on some or all of the edge nodes, and/or other operations that can be remotely ordered and applied locally at an edge node.

Updates to the distributed ledger are propagated to all of the nodes (such as the edge nodes and the management node) according to a blockchain specification, including via peer-to-peer sharing. This permits the management node to communicate change requests to edge nodes through the distributed ledger in a secure and immutable way. This also permits generation of a historic and current record of the management operations. As such, a historic and current state of the system may be stored and retrieved from the distributed ledger.

Each of the edge nodes may act as a full node that stores a complete or at least updated copy of the distributed ledger. In some instances, none of the edge nodes have permission to write to the distributed ledger and therefore cannot issue change requests to other edge nodes. An edge node may read its local copy of the distributed ledger to obtain the change requests. Upon receipt of a change request, the edge node may implement the change request and update its state to indicate the change request has been implemented. This state transition may be broadcast to other nodes, such as in the form of a blockchain transaction. The management node may collect transactions not yet written to the distributed ledger and write them to the distributed ledger, thereby ensuring an immutable and distributed record of change requests and state transitions. As such, the distributed ledger may record the current and historic configuration of the edge nodes.

Use of the foregoing architecture ensures management operations are secured, non-repudiated, sequenced, and permissioned. Management operations become partially "decentralized"; as a data center within a computer network serves as a management node that enforces policies and electronically proposes changes. Once a change is mined into the distributed ledger, each of the systems implement the change and there is a clear record and undisputable record of state of the system as it progressed and evolved over time. For example, an edge node can synchronize its copy of the distributed ledger from other edge nodes (or from the management node) to obtain the current, valid, and immutable configuration of the system. The foregoing permits system scaling, as any participant of the system may access current (and historic) state information from the distributed ledger. New edge nodes may be added by providing the new node with a copy of the distributed ledger. A new edge node may then configure itself according to the current state information from its copy of the distributed ledger or otherwise obtain software or other updates consistent with the current state information.

Figure 1:
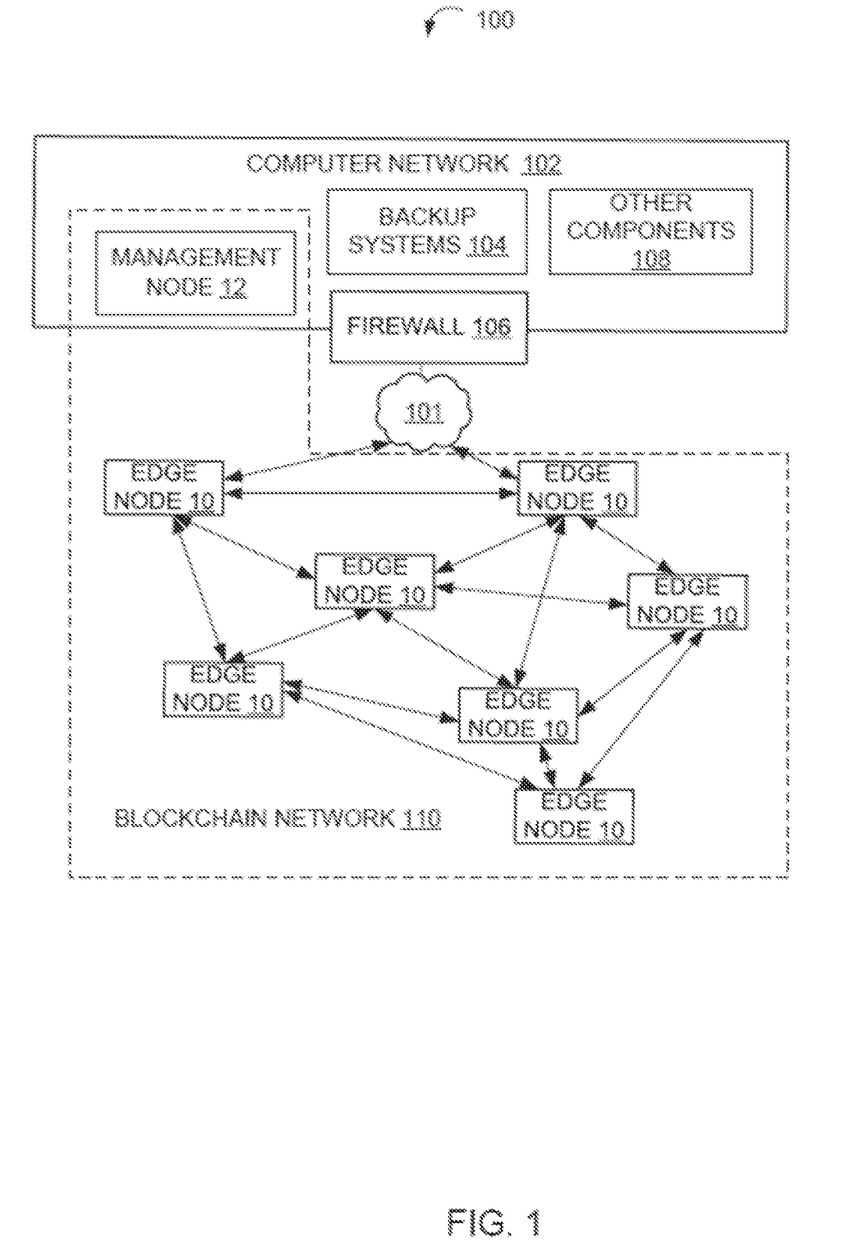
FIG. 1 illustrates an example of a system of decentralized management of device assets outside a computer network, according to an implementation of the invention.

FIG. 1 illustrates an example of a system 100 of decentralized management of device assets outside a computer network 102, according to an implementation of the invention. System 100 may include a blockchain network 110. The blockchain network 110 may include a plurality of nodes that are connected to one another using one or more connection protocols, including a peer-to-peer connection protocol. The nodes of the blockchain network 110 may include a management node 12 and edge nodes 10. The particular number of, configuration of, and connections between the edge nodes 10 may vary. As such, the arrangement of the edge nodes 10 shown in FIG. 1 is for illustrative purposes only.

The management node 12 is part of and operates within a firewall 106 of computer network 102 and the edge nodes 10 operate outside the firewall. The computer network 102 may also include one or more backup systems 104 that provides failover protection for the management node 12 and/or other components 108 operating within the computer network. The components of the computer network 102 may communicate with one another via a local area network ("LAN"), which can be wired, wireless, or hybrid. The components of the computer network 102 may communicate with devices outside the computer network 102 through the firewall 106. The firewall 106 may be configured as a software firewall and/or a hardware firewall device. The firewall 106 may include or connect with a network switch device that routes network traffic into and out of the computer network via the firewall. Computer network 102 and blockchain network 110 can be connected via a network 101. The network 101 may include a wide area network ("LAN") that connects devices outside the firewall 106.

Figure 2:
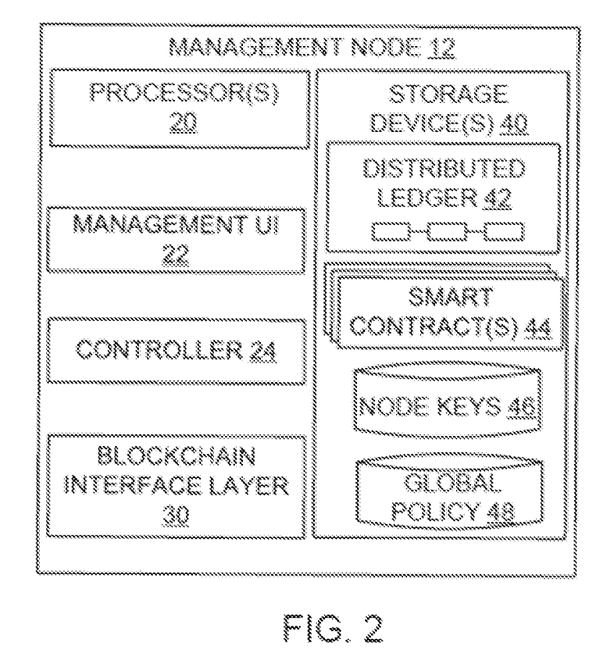
FIG. 2 illustrates an example of a management node in a blockchain network for decentralized management of device assets outside a computer network, according to an implementation of the invention.

Examples of further details of a management node 12 will now be described with reference to FIG. 2. The management node 12 may include one or more processors 20 (also interchangeably referred to herein as processors 20, processor(s) 20, or processor 20 for convenience), management user interface 22, a controller 24, blockchain interface layer 30. Management node 12 may further include one or more storage devices 40, and/or other components. For example, in some embodiments, the one or more storage devices 40 may store distributed ledger 42, smart contract(s) 44, node keys 46, and global policy 48 (described in greater detail below). The processor 20 may be programmed by one or more computer program instructions. For example, the processor 20 may be programmed to execute the management user interface 22, the controller 24, the blockchain interface layer 30, and/or other instructions to perform various operations, each of which are described in greater detail herein. As used herein, for convenience, the various instructions will be described as performing an operation, when, in fact, the various instructions program the processors 20 (and therefore management node 12) to perform the operation.

The management user interface 22 may provide an interface) such as a graphical user interface, a command line interface, and/or other type of interface configured to receive management option inputs. For instance, a user such as a system administrator may use the management user interface 22 to input management operations to be conducted on one or more of the edge nodes 10 of the blockchain network 110, or to input an edge node to be added. In this manner, the user may manage edge nodes 10 based on change requests originating from within the computer network 102.

The controller 24 may obtain management operations to be performed and may communicate them to the relevant edge nodes 10. The management operations may be obtained from the management user interface 22 and/or a global policy 48. Controller 24 may communicate the management operations using the blockchain interface layer 30. For example, the controller 24 may write the management operations into a blockchain transaction that is broadcast to the edge nodes 10. The blockchain transaction may be broadcast using a multicast protocol to several or all edge nodes 10. In some instances, the blockchain transaction may be broadcast using peer-to-peer networking in which the management node 12 acts as a peer to broadcast the transaction to at least one other peer (in this case, an edge node 10), which broadcasts the transaction to other peers and so on. In some implementations, the controller 24 may wait until a blockchain transaction is signed by an edge node 10 as described herein before writing the transaction to a block (also referred to herein as a "ledger block") of the distributed ledger 42. In these implementations, the edge nodes 10 may obtain management operations directly from the broadcasted transaction. In other implementations, the controller 24 may write the transaction to a block of the distributed ledger 42. In these implementations, the edge nodes 10 may obtain management operations by obtaining the current (in other words latest) block that references transactions having management operations.

In whichever manner the controller 24 broadcasts the management operations to edge nodes 10 using the blockchain interface layer 30, the controller may do so to in a manner that is directed all edge nodes 10. For example, a management operation of "check status" may be directed to all nodes of the blockchain network 110 so that each edge node is instructed to perform a status check. Each edge node 10 will then perform the status check and broadcast its state indicating the results of the status check (or other management operation as described below).

In some instances, the controller 24 may target one or more edge nodes 10 to receive a management operation. In these implementations, the controller 24 may generate a blockchain transaction and/or a block on the distributed ledger 42 directed to the targeted edge node(s) 10. For instance, the controller 24 may encode an identifier of the edge node 10 that is targeted. Alternatively or additionally, the controller may encode a device type that targets certain types of edge nodes 10 that should perform management operations. Still other examples include locations that should be targeted such that edge nodes in certain geolocations are targeted. The smart contracts 44 may include rules, which each edge node 10 follows, that direct the nodes to inspect transactions and/or blocks to determine whether it should apply a management operation contained in the transaction and/or block. In some implementations, the controller 24 may encrypt the management operation to be performed with a target edge node's 10 public key such that only the target edge node can decrypt the management operation with its private key.

In some instances, certain management operations may be executed periodically without user intervention. For example, controller 24 may execute a daemon or other process that periodically causes a status check from all edges nodes 10 to be executed. This daemon may periodically generate relevant change requests, which are issued to the edge nodes 10—and tracked via—the distributed ledger 42.

In an implementation, the controller 24 may enforce global policy 48 by ensuring that the state of the network complies with the global policy. For instance, the controller 24 may periodically obtain the current system state from the distributed ledger 42, As noted elsewhere, state transitions of the edge nodes 10 may be recorded on the distributed ledger 42. Alternatively or additionally, the result of status checks may be written to the distributed ledger 42, indicating the current state of the system. The controller 24 may compare the current system state (such as state of the blockchain network 110) with the global policy 48, which may specify a desired state of the system. The desired state may include a macro state of the system as a whole and/or a micro-state of any individual or group of edge nodes. Any discrepancies may be noted and an edge node 10 in non-compliance may be targeted for executing a management operation that will resolve the non-compliance. In some instances, the smart contracts 44 and/or global policy 48 may encode rules that specify when a non-complying edge node 10 should be taken offline. For instance, the rules may specify an edge node 10 that continues to be in non-compliance after N number of blocks have been written to the distributed ledger 42 should be taken offline. Other parameters may specify such removal as well. The foregoing may ensure recurring policy enforcement and compliance using the blockchain interface layer 30.

In an implementation, in connection with certain types of management operations, the controller 24 may make available files for download. For instance, operating system images, software updates, new software, and/or other downloadable files or data may be made available for edge nodes 10 to download in connection with a management operation. This may ensure that the distributed ledger 42 itself does not have to store such files or data but stores an immutable record of current files or data that should be used (as well as historic listing of such files or data).

The blockchain interface layer 30 may be used to interface with the distributed ledger 42 in accordance with the smart contracts 44. The blockchain interface layer 30 is described with reference to FIG. 4 below.

The storage devices 40 may store a distributed ledger 42, smart contracts 44, node keys 46, and/or other data. The distributed ledger 42 may include a series of blocks of data that reference at least another block, such as a previous block. In this manner, the blocks of data may be chained together. An example of a distributed ledger is described in the well-known white paper "Bitcoin: A Peer-to-Peer Electronic Cash System," by Satoshi Nakamoto (bitcoin.org), the contents of which are incorporated by reference in its entirety herein. The distributed ledger 42 may store blocks that indicate a state of an edge node 10 relating to its configuration or other management information.

The smart contracts 44 may include rules that configure nodes to behave in certain ways in relation to decentralized management of edge nodes. For example, the rules may specify deterministic state transitions, which nodes may enroll to participate in decentralized management, rules for implementing a change request issued by the management node 12, and/or other actions that an edge node 10 or management node 12 may take for decentralized management.

The node keys 46 may store public encryption keys of edge nodes 10 in association with their identifiers (such as Internet Protocol or other addresses and/or identifying information). In this manner, in some implementations, change requests may be targeted to specific edge nodes 10 and encrypted using the target edge node's public key.

The global policy 48 may store a security or other policy for the system. The global policy 48 may include, for example, network configuration settings, security configuration settings, operating system settings, application settings, policy rules, and/or other policy information for devices managed by the management node 12.

Figure 3:
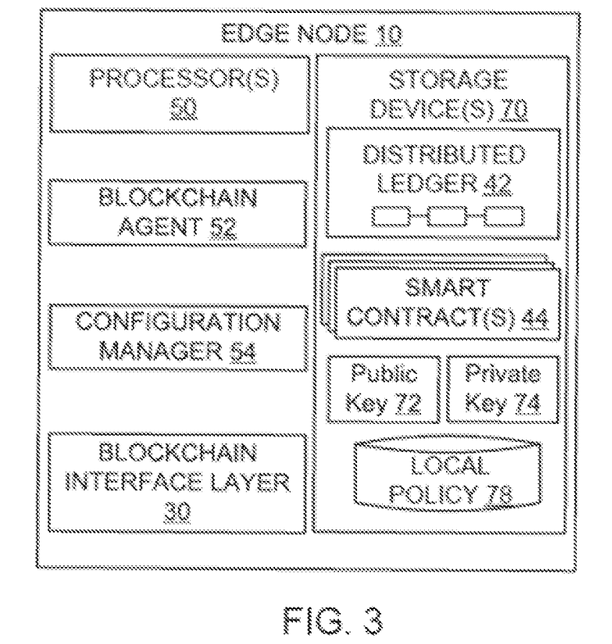
FIG. 3 illustrates an example of an edge node in a blockchain network for decentralized management of device assets outside a computer network, according to an implementation of the invention.

Examples of further details of an edge node 10 will now be described with reference to FIG. 3. An edge node 10 may be a fixed or mobile device. While only one of the edge nodes 10 is illustrated in detail in the figures, each of the edge nodes 10 may be configured in the manner illustrated. The edges nodes 10 may communicate with one another in a peer-to-peer manner. The edge nodes 10 may each include one or more processors 50 (also interchangeably referred to herein as processors 50, processor(s) 50, or processor 50 for convenience), blockchain agent 52, configuration manager 54, and blockchain interface layer 30 Additionally, the edge nodes 10 may further include one or more storage devices 70, and/or other components. In some embodiments, storage devices 70 may store distributed ledger 42, smart contract(s) 44, public key 72, private key 74, and local policy 78 (described in greater detail below).

The processor 50 may be programmed by one or more computer program instructions. For example, the processor 50 may be programmed to execute a blockchain agent 52, a configuration manager 54, a blockchain interface layer 30, and/or other instructions to perform various operations, each of which are described in greater detail herein. As used herein, for convenience, the various instructions will be described as performing an operation, when, in fact, the various instructions program the processors 50 (and therefore edge node 10) to perform the operation.

The blockchain agent 52 may use the blockchain interface layer 30 to communicate with other edge nodes 10 and/or management node 12, The blockchain interface layer 30, described with reference to FIG. 4, may operate in the same manner at management node 12 and edge node 10 to communicate with the blockchain network (other than being able to write to the distributed ledger 42). For example, the blockchain agent 52 may obtain an updated copy of the distributed ledger 42 from one or more other edge nodes 10 and/or management node 12. The blockchain agent 52 may also obtain management operations from the distributed ledger 42 written by the management node 12. In this manner, the management node 12 may communicate management operations to be performed at an edge node 10 through the distributed ledger 42.

The configuration manager 54 may obtain one or more management operations from the blockchain agent 52. The configuration manager 54 may apply the one or more management operations to the edge node 10. In some instances, the configuration manager 54 may apply the management operations without a determination of whether to do so. In other instances, the configuration manager 54 may consult one or more local policies to ensure that the edge node 10 can comply with the one or more management operations. The local policies may be encoded by the smart contracts 44. Alternatively or additionally, some local policies may be stored in a local policy 78, which is not necessarily shared with other edge nodes 10. In other words local policy 78 may be defined specifically at an edge node at which it is stored.

Once the configuration manager 54 has acted on the one or more management operations (whether by applying them or not), the blockchain agent 52 may broadcast its state to other nodes of the blockchain network 110. For example, the blockchain agent 52 may generate and transmit a blockchain transaction that indicates the state of the edge node 10 (such as whether, how, and/or when the one or more management operations have been applied). The blockchain transaction may include information identifying the management operation was (or was not) performed. For example, the information identifying the management operation may be a block identifier (such as a block hash) that identifies the block from which the management operations was obtained. In this manner, the blockchain transaction indicating a node's state may record the management operation that was (or was not) applied.

For implementations in which management operations are targeted to an edge node 10 and encrypted using the targeted edge node 10's public key 72, the blockchain agent 52 may decrypt the management operations using the edge node 10's private key 74. In some implementations, the blockchain agent 52 may digitally sign a blockchain transaction from the management node 12 that includes a management operation. For instance, the management node 12 may generate a transaction directed to the edge node 10 and sign the transaction using the management node 12's public key.

The management node 12 may then write the signed transaction to the distributed ledger 42 to create an immutable record of the management operation and state change of the targeted edge node. In this manner, the transaction may be securely proven to have been executed by the edge node 10. It should be noted that the edge node 10 need not specifically be targeted in order to sign the transaction so as to create a record of the edge node's 10 state in a transaction and therefore block.

Upon receipt of a transaction, the edge node 10 apply the management operation and indicate that it has successfully done so by signing the transaction with the edge node's private key. The management node 12 may write this transaction into the distributed ledger 42, creating a secure, immutable record that proves that the edge node received and applied the management operation. In some implementations, an edge node 10 may be associated with a series of transactions such that each transaction may refer to a previous transaction hash. The transactions may be written to the distributed ledger 42 by the management node 12, creating an immutable and historic record of transactions for a given edge node 10.

In an implementation, the configuration manager 54 may periodically ensure compliance with the current state of the system. For instance, the smart contracts 44 may encode rules that specify what events trigger such checking. The events may include a restart, a new initialization, a passage of a period of time, a number of blocks written to the distributed ledger 42, a security event such as detection of malware, an input from a user specifying that the check should occur, and/or other event that can trigger compliance evaluation. To evaluate compliance, the configuration manager 54 may determine whether any current management operations (as defined by the latest block encoding such operations), including global ones and those specifically targeted to the edge node 10. If so, the configuration manager 54 may determine whether they should have been but were not implemented. If not, the configuration manager 54 may implement the management operations. In this manner, the edge nodes 10 may self-enforce the current management operations (as defined by the current system state).

The storage devices 70 may store an edge node's copy of the distributed ledger 42, the edge node's copy of smart contracts 44, the edge node's public key 72, the edge node's private key 74, local policy 78, and/or other data.

Figure 4:
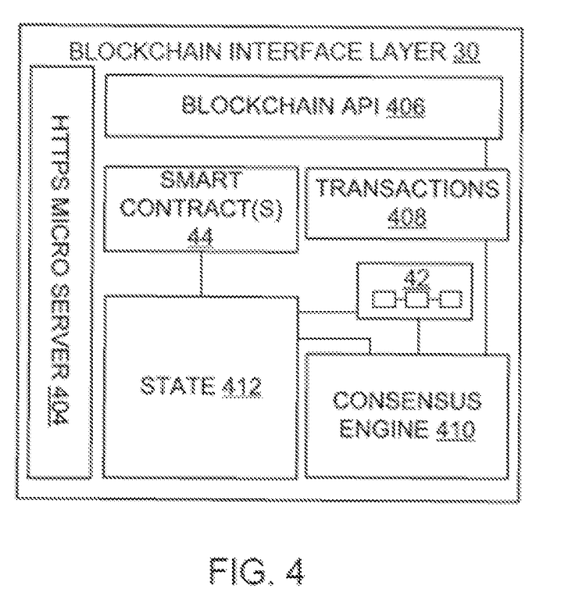
FIG. 4 illustrates an example of a blockchain interface layer for decentralized management of device assets outside a computer network, according to an implementation of the invention.

Reference will now be made to FIG. 4, which illustrates an example of the blockchain interface layer 30. Each of the edge nodes 10 and the management node 12 may implement the blockchain interface layer 30, except that the edge nodes 10 may not have permission to write to the distributed ledger 42. The blockchain interface layer 30 may include a messaging interface used to communicate with the blockchain network 110. The messaging interface may be configured as a Secure Hypertext Transmission Protocol ("HTTPS") microserver 404. Other types of messaging interfaces may be used as well. The blockchain interface layer 30 may use a blockchain API 406 to make calls for blockchain functions based on a blockchain specification. Examples of blockchain functions include, but are not limited to, reading and writing blockchain transactions 408 and reading and writing blockchain blocks to the distributed ledger 42. One example of a blockchain specification is the Ethereum specification. Other blockchain specifications may be used as well.

Consensus engine 410 may include functions that make consensus decisions, such as whether to enroll a node to participate in decentralized management of the edge nodes.

Figure 5:
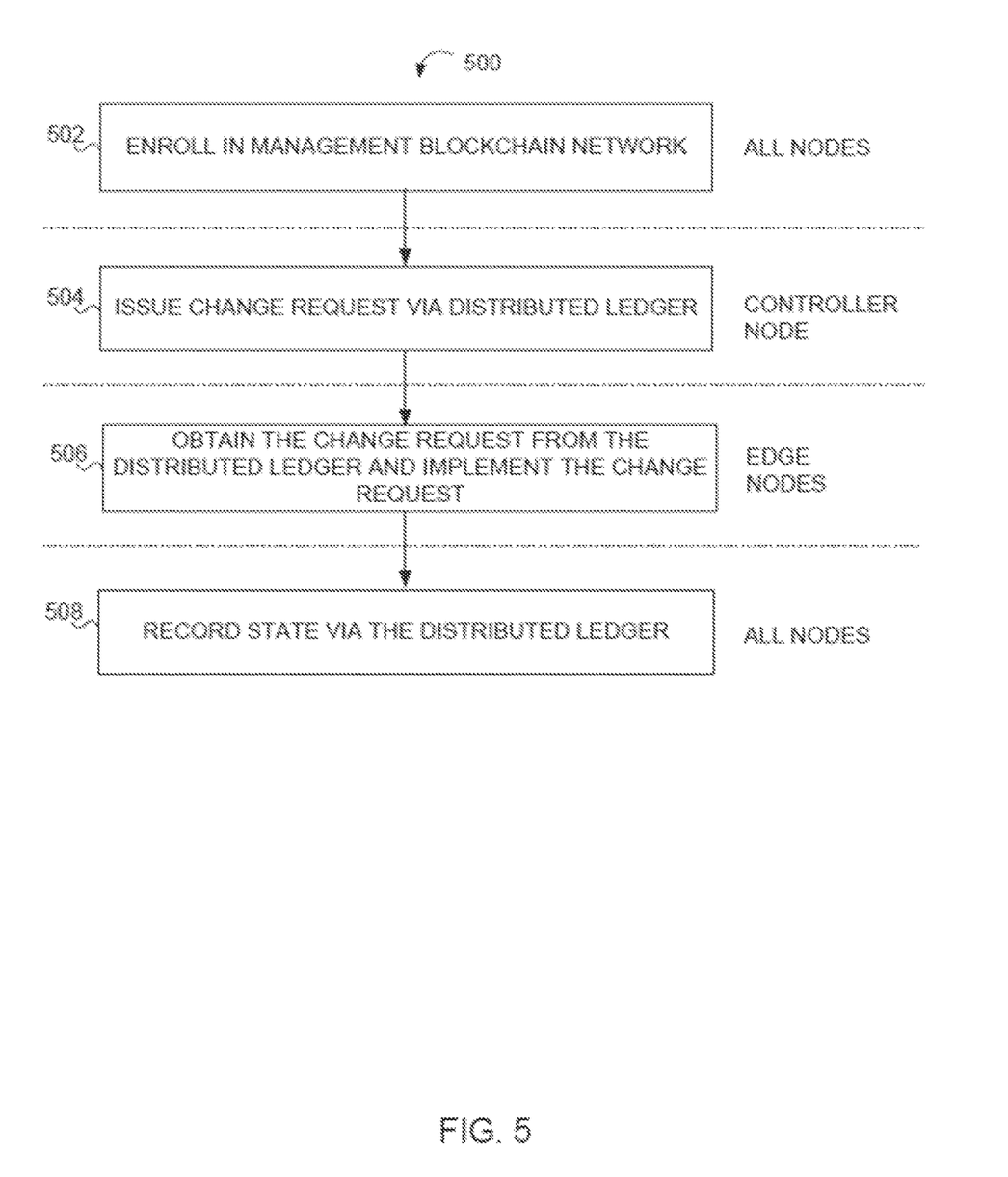
FIG. 5 illustrates an example of a process of decentralized management of device assets outside a computer network, according to an implementation of the invention.

Reference will now be made to FIG. 5, which illustrates an example of a process 500 of decentralized management of device assets outside a computer network 102.

In an operation 502, each of the nodes (including the management node 12 and the edge nodes 10) may enroll into the blockchain network 110. In an implementation, the smart contracts 44 may encode rules for enrolling a node for participation in the blockchain network 110. The rules may specify required credentials and/or other enrollment prerequisites. The required credentials may impose permissions on which nodes are allowed to participate. In these examples, the blockchain network 110 may be configured as a private blockchain where only authorized nodes are permitted to participate in an iteration.

The authorization information and expected credentials may be encoded within the smart contracts 44 or other stored information available to nodes on the blockchain network 110. Once a node has been enrolled, the blockchain network 110 may record an identity of the node and its state so that an identification of all nodes is known. Such recordation may be made via an entry in the distributed ledger 42. As such, the distributed ledger 42 may record a topology of the nodes and a state of the nodes.

In an operation 504, the management node 12 may issue a change request. The change request may be made through the distributed ledger 42 by writing one or more management operations to be performed at the edge nodes 10 as change requests acted on by the edge nodes. For example, the management node 12 may generate a transaction containing the one or more management operations to be performed at the edge nodes 10 and write the transaction as a block into the distributed ledger 42, in which case the edge nodes 10 may obtain the management operations from the distributed ledger 42. In some implementations, the management node 12 may generate and broadcast a blockchain transaction containing the one or more management operations, in which case the edge nodes 10 may obtain the management operations from the broadcasted transactions.

In an operation 506, the edge nodes 10 may obtain and implement the one or more management operations. For example, an edge node 10 may obtain the latest block relating to management operations from its copy of the distributed ledger 42, read one or more transactions referenced in the latest block, and obtain the management operations from the one or more transactions. In other examples, the edge node 10 may obtain the management operations from transactions originating from the management node 12. In these examples, the edge node 10 may obtain the transactions directly from the management node 12 or from a peer edge node 10 (which itself received the transactions from the management node 12 or other peer edge node 10).

In an operation 508, each node may record its state. For example, an edge node 10 may provide to other nodes an indication of whether or not the management operations were performed, and if so, whether successfully performed. The edge node 10 may write its state to a transaction that is shared to other nodes in the blockchain network 110 using the blockchain API 406. The management node 12 may obtain the transactions and mine them into the distributed ledger 42 using the blockchain API 406. Doing so creates an undisputable, tamperproof provenance of the global state of the blockchain network 110.

The foregoing architecture and processes permit the participants of the system to know the full state of the system from their local copy of the distributed ledger 42. This allows the node to take globally valid decisions based on local data, as well as scale to add new nodes or account for restarting nodes that need to synchronize to the current state of the network.

Figure 6:
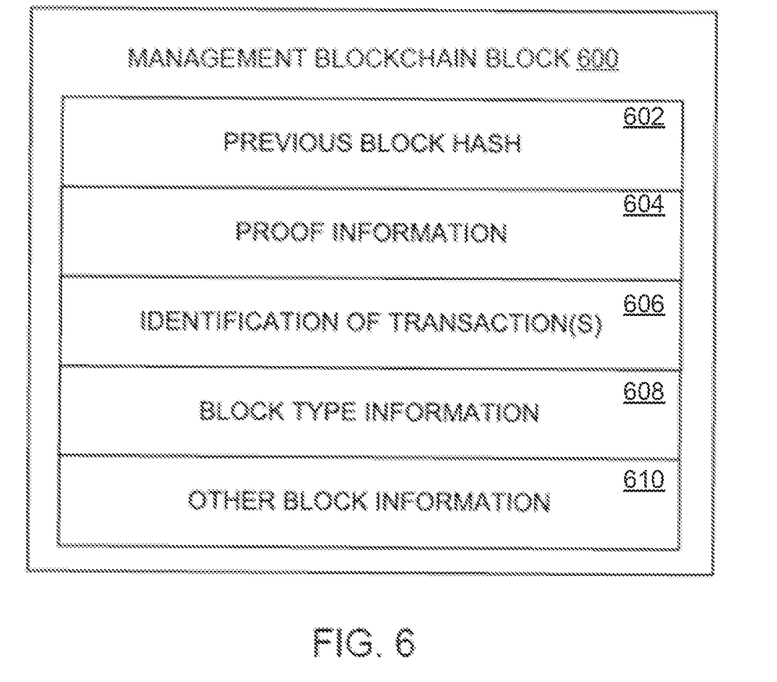
FIG. 6 illustrates a block entry in a distributed ledger that includes transaction information for decentralized management of device assets outside a computer network, according to an implementation of the invention.

FIG. 6 illustrates an example of a blockchain block 600 (also referred to as "block 600"), according to an implementation of the invention. The particular format and configuration of block 600 may be dependent on the blockchain platform used to implement the blockchain network 110. The management node may write transactions to block 600, which is added to distributed ledger 42, The transactions may be submitted by nodes, including the management node 12 and edge node 10, in order to broadcast status information to the blockchain network 110. The management node 12 may also submit transactions to provide management operations to be performed at an edge node 10.

The block 600 may include a payload comprising a previous block hash 602, proof information 604, identification of transactions 606, block type information 608, and/or other block information 610. The previous block hash 602 may include a value of a hash of a previous block. As such, the block 600 may be linked to another (previous) block in the distributed ledger 42. The proof information 604 may include a proof of stake or proof of work, depending on which type of blockchain is implemented. For proof of stake implementations, the proof information may include evidence that a node that generated the block 600 is a management node. Such information may include node credential information (such as an identifier) and/or other information that indicates a proof of stake of the management node. In proof of work implementations, the proof information may indicate a hash value or other challenge response from the management node 12 that indicates that the management node actually performed work required to write the block 600. The transaction data—and the block 600—may be used to coordinate decentralized machine learning across edge nodes 10. The transaction data may include an identification of transactions 606 associated with the block 600. This is because each edge node 10 may have a copy of the distributed ledger 42 and is able to monitor the state of the system.

Figure 7:
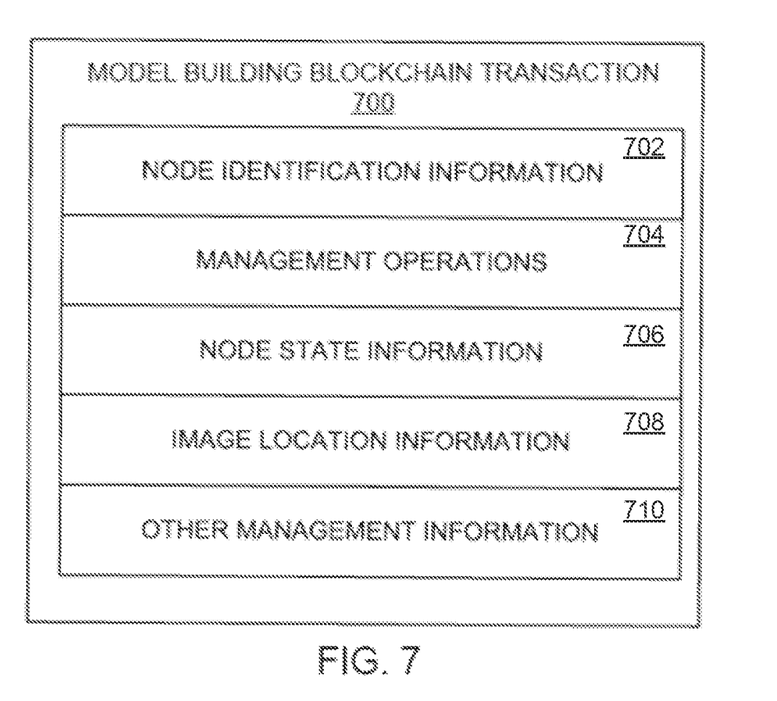
FIG. 7 illustrates an example of a transaction for inclusion in a block entry of a distributed ledger that includes information for decentralized management of device assets outside a computer network, according to an implementation of the invention.

FIG. 7 illustrates an example of a management blockchain transaction 700 (also referred to as "transaction 700"), according to an implementation of the invention. Transaction 700 may include node identification information 702, management operations information 704, node state information 706, image location information 708, and/or other transaction information 710.

The node identification information 702 may include an identification of a node that provided the transaction 700. The management operations information 704 may identify one or more management operations to be performed. For instance, a management node 12 may have written the management operations to be performed not only to issue a change request to edge nodes 10 but also document the current state of the system. The node state information 706 may include information that indicates a state of a node that generated the transaction. The image location information may include a location of where or otherwise how to obtain image or other data to complete the management operations. For example, if a management operation includes a change request to update to a new version of software, the location of such software may be encoded in the image location information 708. In some instances, to the extent that the update is below a threshold size, the image location information may include the update itself. Other transaction information 710, such as a timestamp of when the transaction was created, may be stored as well.

Although illustrated in FIG. 1 as a single component, an edge node 10 or management node 12 may include a plurality of individual components (such as computer devices) each programmed with at least some of the functions described herein. The one or more processors 20 or 50 may each include one or more physical processors that are programmed by computer program instructions. The various instructions described herein are provided for illustrative purposes. Other configurations and numbers of instructions may be used, so long as the processor(s) 20 or 50 are programmed to perform the functions described herein.

Furthermore, it should be appreciated that although the various instructions are illustrated in FIG. 1 as being co-located within a single processing unit, in implementations in which processor(s) 20 or 50 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 20 or 50 may be programmed by one or more additional instructions that may perform some or all of the functionality attributed herein to one of the instructions.

The various instructions described herein may be stored in a storage device 40 or 70, which may comprise random access memory (RAM), read only memory (ROM), and/or other memory. The storage device may store the computer program instructions (such as the aforementioned instructions) to be executed by processor 20 or 50 as well as data that may be manipulated by processor 20 or 50. The storage device may comprise one or more non-transitory machine-readable storage media such as floppy disks, hard disks, optical disks, tapes, or other physical storage media for storing computer-executable instructions and/or data.

The distributed ledger 42, transaction queue, smart contracts 44, management operations to be performed, and/or other information described herein may be stored in various storage devices such as storage device 40 or 70. Other storage may be used as well, depending on the particular storage and retrieval requirements. For example, the various information described herein may be stored using one or more databases. The databases may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The edge nodes 10 and management node 12 illustrated FIG. 1 may be coupled to other nodes via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing figures, different numbers of entities than those depicted may be used. Furthermore, according to various implementations, the components described herein may be implemented in hardware and/or software that configure hardware.

The various processing operations and/or data flows depicted in FIG. 5 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An edge node comprising:
a processor and a memory located outside a private network, wherein the memory to store instructions that, when executed by the processor, cause the processor to:
read from but not write to a distributed ledger of a blockchain network, wherein the blockchain network comprises a management node within the private network to both read and write to the distributed ledger, the management node to generate a first ledger block of the distributed ledger, wherein the first ledger block contains a change request for the edge node, and wherein the change request corresponds to a management operation;
access the change request from a copy of the distributed ledger stored at the edge node;
determine, by a configuration manager using a local configuration policy, whether the edge node can comply with the management operation;
responsive to the determination that the edge node can comply, implement the change request;
generate a blockchain transaction that indicates the change request has been implemented at the edge node; and
broadcast the blockchain transaction to the blockchain network.

2. The edge node of claim 1, wherein the management operation comprises an operation to remove the edge node from the blockchain network, an operation to add the edge node to the blockchain network, an operation to update software installed on the edge node, or an operation to execute a status check on the edge node.

3. The edge node of claim 1, wherein the instructions, when executed by the processor, further cause the processor to:
determine that an event at the edge node has occurred;
trigger a synchronization with a current state of the blockchain network;
obtain a current copy of the distributed ledger from one of another edge node of the blockchain network or the management node;
obtain a current state of the blockchain network based on the current copy of the distributed ledger; and
configure the edge node based on the current state of the blockchain network.

4. The edge node of claim 1, wherein the edge node is one of a plurality of edge nodes, and the instructions, when executed by the processor, further cause the processor to enroll the edge node with the blockchain network to participate in decentralized management of one or more edge nodes of the plurality of edge nodes.

5. The edge node of claim 1, wherein the instructions, when executed by the processor, further cause the processor to determine that the change request is directed to the edge node based on a parameter associated with the change request.

6. The edge node of claim 5, wherein the parameter comprises at least one of an edge node identification, an edge node type, or an edge node geographical location.

7. The edge node of claim 1, wherein the change request is encrypted by a public key corresponding to the edge node, and the instructions, when executed by the processor, further cause the processor to decrypt the change request using a private key corresponding to the public key.

8. The edge node of claim 1, wherein the instructions, when executed by the processor, further cause the processor to apply a rule of a smart contract to determine whether the local policy for the edge node permits the edge node to implement the request.

9. The edge node of claim 1, wherein the instructions, when executed by the processor, further cause the processor to check a state of the edge node responsive to an event specified by a rule of a smart contract.

10. The edge node of claim 9, wherein the event comprises a restart of the edge node, an initialization of the edge node, a passage of a predefined period of time, a number of blocks written to the distributed ledger, or a security event.

11. A method comprising:
reading from, by an edge node, but not writing to, by the edge node, a distributed ledger of a blockchain network, wherein the blockchain network comprises a management node within the private network to both read and write to the distributed ledger, the management node to generate a first ledger block of the distributed ledger, wherein the first ledger block contains a change request for the edge node, and wherein the change request corresponds to a management operation;
accessing, by the edge node, the change request from a copy of the distributed ledger stored at the edge node;
determining, by a configuration manager using a local configuration policy, whether the edge node can comply with the management operation;
responsive to the determination that the edge node can comply, implementing, by the edge node, the change request;
generating, by the edge node, a blockchain transaction that indicates the change request has been implemented at the edge node; and
broadcasting, by the edge node, the blockchain transaction to the blockchain network.

12. The method of claim 11, wherein the management operation comprises an operation to remove the edge node from the blockchain network, an operation to add the edge node to the blockchain network, an operation to update software installed on the edge node, or an operation to execute a status check on the edge node.

13. The method of claim 11, further comprising:
determining that an event at the edge node has occurred;
triggering a synchronization with a current state of the blockchain network;
obtaining a current copy of the distributed ledger from one of another edge node of the blockchain network or the management node;
obtaining a current state of the blockchain network based on the current copy of the distributed ledger; and
configuring the edge node based on the current state of the blockchain network.

14. The method of claim 11, wherein the edge node comprises a given edge node of a plurality of edge nodes, the method further comprising:
enrolling, by the given edge node, the given edge node with the blockchain network to participate in decentralized management of one or more edge nodes of the plurality of edge nodes.

15. A non-transitory machine-readable storage medium that stores machine-readable instructions that, when executed by a hardware processor associated with an edge node, cause the hardware processor to:

read from but not write to a distributed ledger of a blockchain network, wherein the blockchain network comprises a management node within a private network to both read and write to the distributed ledger, the management node to generate a first ledger block of the distributed ledger, wherein the first ledger block contains a change request for the edge node, and wherein the change request corresponds to a management operation;

access the change request from a local copy stored on the edge node;

determine, by a configuration manager using a local configuration policy, whether the edge node can comply with the management operation;

responsive to the determination that the edge node can comply, implement the change request;

generate a blockchain transaction that indicates the change request has been implemented at the edge node; and broadcast the blockchain transaction to the blockchain network.

16. The storage medium of claim 15, wherein the management operation comprises an operation to remove the edge node from the blockchain network, an operation to add the edge node to the blockchain network, an operation to update software installed on the edge node, or an operation to execute a status check on the edge node.

17. The storage medium of claim 15, wherein the instructions, when executed by the hardware processor, further cause the hardware processor to:

determine that an event at the edge node has occurred;

trigger a synchronization with a current state of the blockchain network;

obtain a current copy of the distributed ledger from one of another edge node of the blockchain network or the management node;

obtain the current state of the blockchain network based on the current copy of the distributed ledger; and configure the edge node based on the current state of the blockchain network.

18. The edge node of claim 1, wherein the local policy is encoded by a smart contract corresponding to the edge node.

* * * * *